United States Patent [19]

Goel

[11] Patent Number: 4,698,409

[45] Date of Patent: Oct. 6, 1987

[54] REACTION PRODUCTS OF ALKANOL AMINES WITH BICYCLIC AMIDE ACETALS AND THEIR APPLICATION IN POLYURETHANE POLYMERS

[75] Inventor: Anil B. Goel, Worthington, Ohio

[73] Assignee: Ashland Oil, Inc., Ashland, Ky.

[21] Appl. No.: 858,979

[22] Filed: May 2, 1986

Related U.S. Application Data

[63] Continuation of Ser. No. 740,663, Jun. 3, 1985, Pat. No. 4,600,796.

[51] Int. Cl.$^4$ .................. C08G 18/77; C08G 18/32
[52] U.S. Cl. ........................................ 528/73; 528/74
[58] Field of Search .................. 564/159; 528/78, 73

[56] References Cited

U.S. PATENT DOCUMENTS

| | | | |
|---|---|---|---|
| 4,558,113 | 12/1985 | Goel | 528/73 |
| 4,562,240 | 12/1985 | Goel et al. | 528/73 |
| 4,584,363 | 4/1986 | Goel et al. | 528/73 |
| 4,600,796 | 7/1986 | Goel | 564/159 |

Primary Examiner—John Kight
Assistant Examiner—Dennis R. Daley
Attorney, Agent, or Firm—John F. Jones

[57] ABSTRACT

The process for preparing a polyurethane by reaction of a polyol component and a polyisocyanate, the improvement comprising using as part of the polyol component a polyol produced by reaction of a bicyclic amide acetal and an alkanol amine at a temperature of at least 120° C.

4 Claims, No Drawings

REACTION PRODUCTS OF ALKANOL AMINES WITH BICYCLIC AMIDE ACETALS AND THEIR APPLICATION IN POLYURETHANE POLYMERS

This is a continuation of U.S. patent application Ser. No. 740,663, filed June 3, 1985, now U.S. Pat. No. 4,600,796.

This invention relates to a process for reacting bicyclic amide acetals with alkanols amines such as diethanol amine at temperatures in the range of 120°–240° C. to yield new amido-amine-ether containing polyols and to use of these new polyols in polyurethane polymers.

The reaction of bicyclic amide acetals with high boiling secondary amines has been described in Synth., 16, 1971 as an unpublished result. No previous description of the reaction of amide acetals with hydroxyl group containing materials has been described. No reaction of alkanol amines with bicyclic amide acetals has been previously described. Bicyclic amide acetals which are useful in this invention include those described in Copending U.S. patent application Ser. Nos. 641,238 now U.S. Pat. No. 4,605,746, and 641,242, now abandoned filed 8/16/84.

I have discovered that alkanol amines will react with bicyclic amide acetals at temperatures of about 120° C. and above and preferably at a temperature in the range of from about 120° C. to about 240° C. to yield polyols containing amido-amine-ether groups.

The bicyclic amide acetals useful in this invention are those conforming to the following Formulas I, II and III:

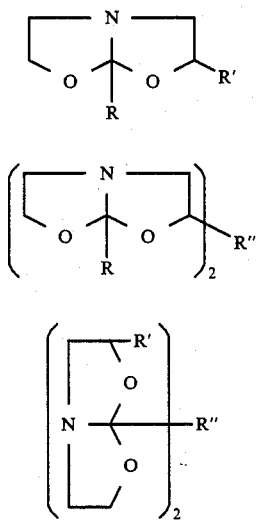

wherein R represents hydrogen, an alkyl group having from 1 to 20 carbon atoms, an aryl group having from 6 to 12 carbon atoms or an alkaryl group having from 7 to 20 carbon atoms, R' represents hydrogen, an alkyl group having from 1 to 10 carbon atoms, an aryl group having from 6 to 12 carbon atoms, an alkaryl group having from 7 to 15 carbon atoms or an ether group having from 1 to 20 carbon atoms, and R" represents an alkylene group having from 1 to 20 carbon atoms or an alkylene ether group having from 1 to 20 carbon atoms.

The alkanol amines which are useful in this invention are those including diethanol amine having the formulas IV and V

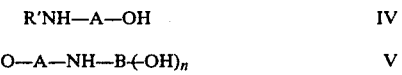

$$HO-A-NH-B(-OH)_n \quad \text{V}$$

where R' has the foregoing definition and A and B independently represent an alkylene group having at least 4 carbon atoms and no more than about 20 carbon atoms carbon or an alkylene ether group containing at least 3 and as many as 100 or more carbon atoms, and n is a number of from 1 to 3.

In the process of this invention the amine group as well as the hydroxyl groups of the alkanol amine react with the bicyclic amide acetal to give the ring opening products providing new polyols having amide, amine and ether groups in the backbone. This reaction is illustrated in its simplest form in the following reaction:

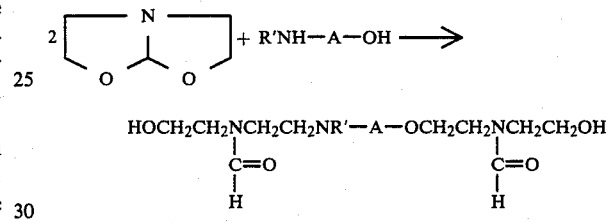

In the process of this invention the major part of the reaction proceeds via the ring opening of the bicyclic amide acetal to form amido-ether groups in the chain and hydroxyl terminal group and a minor part of the reaction (about (10%) produces product having tertiary amine-ether-ester groups. This is believed to be the case based on the infrared spectrum of the reaction mixtures which show the presence of strong tertiary amide band at 1620–40 reciprocal centimeters (cm$^{-1}$) and hydroxyl band at about 3350–3450 cm$^{-1}$ and a weak band at about 1730 cm$^{-1}$ due to carboxylate groups.

I have found that in the 1:1 molar reaction between bicyclic amide acetal and diethanol amine at about 160 degrees C. some diethanol amine remains unreacted while all of the bicyclic amide acetal is consumed in the reaction. Similarly when an excess of the bicyclic amide acetal (2 moles per mole of ethanol amine) is used in the reaction all of the bicyclic amide acetal is consumed and products having higher molecular weight and low hydroxyl number are obtained. This clearly demonstrates that in the reactions of alkanol amines with bicyclic amide acetal both the amino groups and the hydroxyl groups undergo reaction.

The process of this invention can be carried out in the presence of a catalyst such as an alkali or alkaline earth metal or their salts in from 0.01 to 5 mole % based on the alkanol amine.

The polyols obtained in the process of this invention can be used in the production of polyurethane polymers. Polyurethanes produced from the polyols of this invention can be used in reaction injection molding (RIM) processes, thermoset plastic synthesis, adhesive formulations, rigid and semi-rigid foam formation and in other applications some of which are demonstrated in the following Examples. Because the polyols of this invention also contain tertiary amine groups, they can be used as reactive catalysts in the polyurethane/isocyanurate synthesis. Furthermore, the polyols of this invention have been found to be reactive compatibilizers for the fluorinated hydrocarbon blowing agent-polyols mixtures used in rigid polyurethane foam production.

The polyisocyanates useful in the preparation of polyurethanes by reaction with the polyols of this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'diisocyanate, benzene-1,2,4-triisocyanate, xylene-1,4-diphenylene methane diisocyanate, 4,4'diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

The process and products of this invention are further illustrated in the following illustrative examples.

EXAMPLE 1

Diethanol amine (50 g) and 65 g of a bicyclic amide acetal of Formula I in which R is methyl and R' is hydrogen were mixed and heated at about 160 degrees C. under a nitrogen atmosphere with continuous stirring for 3 hours. The solution was subjected to GLC analysis which revealed the complete disappearance of the bicyclic amide acetal; however, approximately 20% of the starting diethanol amine still remained unreacted. The infrared spectrum showed the presence of strong bands due to amide groups (1620–35 cm$^{-1}$) and hydroxyl groups (3350–3450 cm$^{-1}$) and a very weak band due to carboxylate groups (1730 cm$^{-1}$). Additional bicyclic amide acetal (39.5 g) was added and the reaction mixture was further heated for 3 hours at 160° C. The GLC analysis indicated the complete disappearance of amide acetal and the starting diethanol amine level was dropped to about 7%. The hydroxyl number of the mixture of polyols was found to be 516.

EXAMPLE 2

The procedure of Example 1 was followed using 59.7 g of the amide acetal and 20 g of diethanol amine. The reaction mixture was heated at 160° C. for 7 hours. The GLC analysis of the solution indicated the complete disappearance of bicyclic amide acetal and greater than 98% conversion of diethanol amine. The infrared spectrum showed strong bands due to amide and hydroxyl groups at about 1620–40 cm$^{-1}$ and 3350–3450 cm$^{-1}$ respectively. Only trace amounts of ester group band was observed at about 1735 cm$^{-1}$. The hydroxyl number of the polyol product was 428.

EXAMPLE 3

This Example and those that follow demonstrate the applications of polyols obtained in Examples 1 and 2 in polyurethane polymer synthesis and possible use in adhesives, rigid foams, and the like. A solution of 38.4 g of tripropylene glycol and 7.2 g of polyol mixture described in Example 1 was prepared. A 14 g portion of this polyol was mixed with 37.2 g of polyterephthalic ester polyol blended with diethylene glycol as described in U.S. Pat. No. 3,647,759 having a hydroxy number of 350 (commercially available as Chardol 570 from Chardonol Corp.) and the solution was degassed and mixed with 456.6 g of degassed liquid 4,4'-methylene bis (phenyl isocyanate) having an isocyanate equivalent weight of about 144. The resulting mixture was poured into a mold prepared by spacing two silicone release coated glass plates apart in parallel fashion by ⅛ inch thick spacers. Polymerization occurred at ambient temperature within two minutes to give a solid polymer. The molded polymer was postcured in the mold for an additional hour at 135° C. The resulting cured polyurethane was found to have a notched izod impact strength (ASTM D256) of 0.6 foot pounds/inch of notch, unnotched izod impact strength of greater than 14.4 foot pounds/inch, heat distortion temperature (ASTM D648-56) of 85° C., tensile yield strength (ASTM D790) of 17,875 psi and flexural modulus (ASTM D648) of 403,069 psi.

EXAMPLE 4

The procedure of Example 3 was followed using 40 g of tripropylene glycol, 10 g of the polyol mixture of Example 1 and 81 g of the polyisocyanate. The cured polyurethane was found to have an izod impact strength of 0.7 foot pounds/inch of notch, heat distortion temperature of 84° C., tensile yield strength of 17,883 psi and flexural modulus of 408,207 psi.

EXAMPLE 5

The procedure of Example 3 was followed using 40 g of tripropylene glycol, 10 g of the polyol of Example 2 and 82 g of the polyisocyanate. The cured polymer was found to have an izod impact strength of 0.4 foot pounds/inch of notch, flexural strength of 12,554 psi and flexural modulus of 271,375 psi.

EXAMPLE 6

This experiment demonstrates that the polyols obtained from the reactions of diethanol amine with bicyclic amide acetals can be used in adhesive formulations. A mixture of 9 g of tripropylene glycol and 2.5 g of the polyol of Example 2 was degassed and mixed with 128 g of the polyisocyanate of Example 3. The resulting viscous liquid was applied between two one-inch wide and four-inch long sheet molding compound (SMC) panels with a one square inch overlap for the adhesive bond. The bond thickness was 30 mils which was achieved by placing some 30 mils diameter glass beads between the panels before applying the adhesive. The adhesive resin was then cured by allowing it to stand for an hour at room temperature followed by a post curing treatment at 120° C. for 30 minutes. Testing of the resulting adhesive bond showed that failure of the SMC substrate occurred first at about 400 psi. Similarly the adhesive bond was prepared and tested on cold rolled steel sheets and the resulting cured bond was found to have a shear strength of about 1850 psi.

EXAMPLE 7

This experiment demonstrates the use of the polyols of this invention as reactive compatibilizing agents for fluorocarbon-poly (terephthalic ester) polyol mixtures and their use in rigid foam applications. To 11.0 g of poly (terephthalic ester) polyol (hydroxy number 350, Chardol 570 from Chardonol Corp., more fully described in U.S. Pat. No. 3,647,759) was added 2.2 g of the polyol of Example 2 and to the resulting solution was added 5.0 g of fluorocarbon blowing agent (Freon F11B, DuPont). The mixture was vigorously stirred to give a homogeneous solution and the homogeneous solution did not break when kept at room temperature undisturbed for 15 minutes.

EXAMPLE 8

This Example is for comparison purposes and is outside the scope of this invention. The procedure of Example 7 was followed using 10.1 g of poly (terephthalic ester) polyol and 4.1 g of Freon F11B. The homogeneous solution upon standing undisturbed at room temperature showed phase separation in less than 15 minutes.

EXAMPLE 9

A mixture of 13.4 g of poly (terephthalic ester) polyol blended with diethylene glycol with hydroxy number 447 (commercially available as Chardol 560 from Chardonol Corp.), 2.2 g of polyol of Example 1, 0.3 g of tertiary amine catalyst, N,N',N"-tris(dimethylaminopropyl hexahydrotriazine), 0.4 g of silicone surfactant (DC 193 from Dow Corning) and 6.8 g of Freon F11B was mixed with 22 g of the polyisocyanate of Example 3 in a paper cup. A vigorous reaction occurred to give a rigid foam. The foaming characteristics were: a cream time of 18 seconds, a rise time of 28 seconds and a tack free time of 34 seconds. The resulting foam was post cured at 100° C. for five minutes to give a non-friable foam having a 1.6 pounds/cubic foot density and a compressive strength of about 18 psi (rise direction) and 15 psi (width direction).

EXAMPLE 10

The procedure of Example 9 was followed using 13.5 g of poly (terephthalic ester) polyol, 2.3 g of polyol of Example 2, 0.3 g of tertiary amine catalyst, 0.4 g of silicone surfactant, 10 g of talc filler, 6.4 g of Freon F11B and 22 g of polyisocyanate. The foaming characteristics were: cream time of 18 seconds, rise time of 30 seconds, and tack free time of 37 seconds. The resulting rigid foam was post cured at 100° C. for 5 minutes and then was found to have a compressive strength of 19.5 psi (rise direction) and 15 psi (width direction). This foam had improved fire retardancy (self-extinguishing) when compared to the foam of Example 9.

EXAMPLE 11

To 52.5 g of diethanol amine was added 0.23 g of sodium and the mixture was heated at 50° C. for 15 minutes during which time all of the sodium reacted to give a clear solution. This solution was mixed with 129 g of the bicyclic amide acetal described in Example 1 and the resulting mixture was heated at about 160° C. for 5½ hours. GLC of the resulting reaction mixture showed a complete consumption of the diethanol amine. The final viscous liquid polyol product was found to have a hydroxyl number of 530 and the infrared spectrum showed the presence of amide groups (1630 cm$^{-1}$) and hydroxyl groups (3350–3450 cm$^{-1}$).

EXAMPLE 12

The procedure of Example 3 was followed using 5 g of the polyol of Example 11, 20 g of tripropylene glycol and 36.25 g of liquid 4,4'-methylene-bis(phenyl isocyanate). The polymer sheet obtained after curing at 100° C. for 1 hour followed by 1 hour at 130° C. had a notched izod impact strength of 0.8 foot pounds/inch of notch.

EXAMPLE 13

The procedure of Example 3 was followed using 2.5 g of the polyol of Example 11, 10 g of tripropylene glycol, 25 g of polyterephthalic ester polyol and 47 g of liquid 4,4'-methylene-bis(phenyl isocyanate). The cured polymer sheet was found to have a notched izod impact strength of 0.8 foot pounds/inch of notch.

I claim:

1. In the process for preparing a polyurethane by reaction of a polyol component and a polyisocyanate, the improvement comprising using as part of the polyol component a polyol produced by reaction of a bicyclic amide acetal and an alkanol amine at a temperature of at least 120° C.

2. The process of claim 1 wherein the bicyclic amide acetal is one conforming to at least one of the Formulas I, II or III

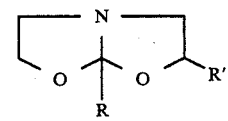

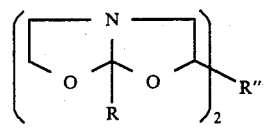

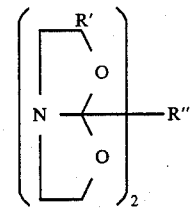

Wherein R represents hydrogen, an alkyl group having from 1 to 20 carbon atoms, an aryl group having from 6 to 12 carbon atoms or an alkaryl group having from 7 to 20 carbon atoms, R' represents hydrogen, an alkyl group having from 1 to 10 carbon atoms, an aryl group having from 6 to 12 carbon atoms, an alkaryl group having from 7 to 15 carbon atoms, an alkaryl group having from 7 to 15 carbon atoms, or an ether group having from 1 to 20 carbon atoms, and R" represents an alkylene group having from 1 to 20 carbon atoms or an alkylene ether group having from 1 to 20 carbon atoms.

3. The process of claim 2 wherein the alkanol amine is at least one having formula IV or V $$R'-NH-A-OH \qquad IV$$

-continued $$HO-A-NH-B-(OH)_n \quad V$$

wherein R' has the foregoing designation, A and B independently represent an alkylene group having at least 4 carbon atoms or an alkylene ether group containing 3 or more carbon atoms and n is a number of from 1 to 3.

4. The process of claim 3 wherein the bicyclic amide acetal is one of formula I wherein R is methyl and R' is hydrogen and the alkanol amine is diethanol amine.

* * * * *